United States Patent
Cui et al.

(10) Patent No.: US 11,447,141 B2
(45) Date of Patent: Sep. 20, 2022

(54) METHOD AND DEVICE FOR ELIMINATING STEADY-STATE LATERAL DEVIATION AND STORAGE MEDIUM

(71) Applicant: Baidu Online Network Technology (Beijing) Co., Ltd., Beijing (CN)

(72) Inventors: Xiao Cui, Beijing (CN); Dingfeng Guo, Beijing (CN); Zhenguang Zhu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 130 days.

(21) Appl. No.: 16/788,673

(22) Filed: Feb. 12, 2020

(65) Prior Publication Data

US 2020/0269853 A1    Aug. 27, 2020

(30) Foreign Application Priority Data

Feb. 22, 2019    (CN) .......................... 201910133961.2

(51) Int. Cl.
*B60W 40/10* (2012.01)
*B60W 60/00* (2020.01)
*B60W 30/12* (2020.01)

(52) U.S. Cl.
CPC ............ *B60W 40/10* (2013.01); *B60W 30/12* (2013.01); *B60W 60/001* (2020.02);
(Continued)

(58) Field of Classification Search
CPC .... B60W 40/10; B60W 60/001; B60W 30/12; B60W 2552/20; B60W 2552/30;
(Continued)

(56) References Cited

U.S. PATENT DOCUMENTS 6,487,475 B1 * 11/2002 Yoshikawa ............ G08B 21/06
                                                        701/1
6,889,161 B2 *  5/2005 Winner .............. B60K 31/0008
                                                      702/147
(Continued)

FOREIGN PATENT DOCUMENTS

CN      108137015 A      6/2018
CN      108427417 A      8/2018
(Continued)

OTHER PUBLICATIONS

CN-111267853-A Translation (Year: 2020).*
(Continued)

*Primary Examiner* — Jeff A Burke
*Assistant Examiner* — Kyle T Johnson
(74) *Attorney, Agent, or Firm* — Benesch, Friedlander, Coplan & Aronoff LLP

(57) ABSTRACT

A method and a device for eliminating a steady-state lateral deviation and a storage medium are provided. The method includes: determining whether a vehicle travels on a straight road; collecting a lateral deviation value of the vehicle in a case that the vehicle travels on a straight road; determining whether the vehicle has the steady-state lateral deviation based on the collected lateral deviation value; and compensating the steady-state lateral deviation of the vehicle in real time based on the collected lateral deviation value in a case that the vehicle has the steady-state lateral deviation. The vehicle has the steady-state lateral deviation may run steadily, a direction of the vehicle is more accurate, self-driving safety and efficiency are improved, the sense of leftward and rightward swaying brought by a continuous deviation rectification method in the conventional art is effectively eliminated, and self-driving stability is improved.

20 Claims, 8 Drawing Sheets

(52) U.S. Cl.
CPC ..... *B60W 2520/06* (2013.01); *B60W 2520/10* (2013.01); *B60W 2540/18* (2013.01); *B60W 2552/05* (2020.02); *B60W 2552/20* (2020.02); *B60W 2552/30* (2020.02)

(58) Field of Classification Search
CPC ........ B60W 2552/05; B60W 2520/06; B60W 2520/10; B60W 2540/18; B60W 2554/20; B60W 2554/802; B60W 2050/002; B60W 2050/0088; B60W 2556/10; B60W 2050/0075; B60W 60/00; B62D 6/00; B62D 15/025
See application file for complete search history.

(56) References Cited

U.S. PATENT DOCUMENTS

| | | | | |
|---|---|---|---|---|
| 8,150,591 | B2* | 4/2012 | Isaji | B60W 30/18145 701/70 |
| 8,606,539 | B2* | 12/2013 | Takabayashi | G01S 7/2955 702/142 |
| 9,327,765 | B2* | 5/2016 | Takeda | B62D 6/003 |
| 10,378,890 | B2* | 8/2019 | Seo | G01B 11/275 |
| 2014/0297094 | A1 | 10/2014 | Dolgov et al. | |
| 2015/0025771 | A1 | 1/2015 | Seo et al. | |
| 2018/0023951 | A1* | 1/2018 | Seo | B60W 30/12 356/138 |
| 2018/0037256 | A1* | 2/2018 | Maeda | B62D 1/286 |
| 2018/0057054 | A1 | 3/2018 | Tokoro | |
| 2018/0304918 | A1 | 10/2018 | Kunihiro et al. | |
| 2018/0374352 | A1* | 12/2018 | Matsunaga | B60W 30/095 |
| 2019/0063943 | A1* | 2/2019 | Sunil Kumar | G01C 21/367 |
| 2019/0210598 | A1* | 7/2019 | Endo | B62D 6/002 |
| 2019/0359202 | A1* | 11/2019 | Zhu | B60W 40/04 |
| 2020/0269853 | A1* | 8/2020 | Cui | B60W 60/00 |
| 2020/0377089 | A1* | 12/2020 | Fukushige | G06V 20/588 |
| 2021/0245777 | A1* | 8/2021 | Mori | B60W 60/001 |

FOREIGN PATENT DOCUMENTS

| | | | |
|---|---|---|---|
| CN | 108820039 A | 11/2018 | |
| CN | 109109861 A | 1/2019 | |
| CN | 109195860 A | 1/2019 | |
| CN | 111267853 A * | 6/2020 | ............... B60Q 9/00 |
| CN | 111332276 A * | 6/2020 | ............... B62D 6/04 |
| EP | 0640903 A1 * | 3/1995 | ........... G05D 1/0246 |
| EP | 1742124 A1 | 1/2007 | |
| EP | 3360746 A | 8/2018 | |
| JP | H1191609 A | 4/1999 | |
| JP | 2003-327012 A | 11/2003 | |
| JP | 2006312421 A | 11/2006 | |
| JP | 2007296947 A | 11/2007 | |
| JP | 2018-122731 A | 8/2018 | |
| KR | 1020180009924 A | 1/2018 | |
| WO | WO-2010004911 A1 * | 1/2010 | ............. G08G 1/161 |

OTHER PUBLICATIONS

CN-111332276-A Translation (Year: 2020).*
WO-2010004911-A 1 (Year: 2010).*
Notice of Reasons for Refusal issued by the Japanese Patent Office in Japanese Patent Application No. 2020-022646, dated Apr. 5, 2021 (6 pages).
First Office Action of Application No. 201910133961.2; 8 pages; translation attached.
First Search Report of Application No. 2019101339612; 4 pages; translation attached.
Extended European Search Report in European Patent Application No. 20158424.0, dated Jul. 24, 2020 (7 pages).
Notice of Reasons for Refusal from Korean Intellectual Property Office in Korean Patent Application No. 10-2020-0019984, dated Feb. 25, 2021 (15 pages).
Notification of Reason for Refusal issued by the Korean Intellectual Property Office in Korean Application No. 10-2020-0019984, dated Aug. 23, 2021 (10 pages).

* cited by examiner

METHOD AND DEVICE FOR ELIMINATING STEADY-STATE LATERAL DEVIATION AND STORAGE MEDIUM

CROSS-REFERENCE TO RELATED APPLICATION

This application claims priority to Chinese Patent Application No. 201910133961.2, entitled "METHOD AND DEVICE FOR ELIMINATING STEADY-STATE LATERAL DEVIATION AND STORAGE MEDIUM", and filed on Feb. 22, 2019, which is hereby incorporated by reference in its entirety.

TECHNICAL FIELD

The disclosure relates to the field of self-driving, and more particularly to a method and a device for eliminating steady-state lateral deviation of self-driving and a storage medium.

BACKGROUND

Because of inconsistency of respective vehicles (for example, inaccurate positioning of four wheels of the vehicle and zero deviation of a steering wheel) and an angular deviation of an Inertial Measurement Unit (IMU), a lateral control unit may have a steady-state lateral deviation in a self-driving mode of the vehicle. The vehicle is deviated from a centerline of a road, and a relatively great lateral error may be produced particularly during turning. Consequently, problems about self-driving safety, stability and the like are brought.

SUMMARY

A method and a device for eliminating steady-state lateral deviation and a storage medium are provided according to embodiments of the disclosure, which eliminate the sense of leftward and rightward swaying brought by a continuous deviation rectification method in the existing technology and improve self-driving stability.

According to a first aspect, a method for eliminating a steady-state lateral deviation is provided according embodiments of the present disclosure, which may include: determining whether a vehicle travels on a straight road; collecting a lateral deviation value of the vehicle in a case that the vehicle travels on a straight road; determining whether the vehicle has the steady-state lateral deviation based on the collected lateral deviation value; and compensating the steady-state lateral deviation of the vehicle in real time based on the collected lateral deviation value in a case that the vehicle has the steady-state lateral deviation.

In an implementation mode, determining whether the vehicle travels on the straight road may include: detecting a curvature of the road where the vehicle travels, a steering wheel angle of the vehicle and a velocity of the vehicle; and determining that the vehicle travels on the straight road in a case that the curvature of the road where the vehicle travels is smaller than a first predetermined value, the steering wheel angle of the vehicle is smaller than a second predetermined value and the velocity of the vehicle is greater than a third predetermined value.

In an implementation mode, determining whether the vehicle has the steady-state lateral deviation based on the collected lateral deviation value may include: determining that the vehicle has the steady-state lateral deviation in a case that the collected lateral deviation value is within a predetermined range.

In an implementation mode, collecting the lateral deviation value of the vehicle may include: collecting the lateral deviation value of the vehicle repeatedly to obtain multiple lateral deviation values; determining that the vehicle has the steady-state lateral deviation based on the collected lateral deviation value comprises: calculating a statistical lateral deviation value based on the collected multiple lateral deviation values, and determining that the vehicle has the steady-state lateral deviation in a case that the statistical lateral deviation value is within the predetermined range; and compensating the steady-state lateral deviation of the vehicle in real time based on the collected lateral deviation value comprises: compensating the steady-state lateral deviation of the vehicle in real time based on the statistical lateral deviation value.

In an implementation mode, after compensating the steady-state lateral deviation of the vehicle in real time, the method further includes: recollecting the lateral deviation value of the vehicle to determine whether the steady-state lateral deviation is eliminated; linearly modifying the statistical lateral deviation value based on a predetermined step length and compensating the steady-state lateral deviation of the vehicle based on the modified statistical lateral deviation value, in response to determining that the steady-state lateral deviation is not eliminated; and repeatedly executing the step of recollecting the lateral deviation value of the vehicle until it is determined that the steady-state lateral deviation is eliminated.

In an implementation mode, the method may further include: storing the steady-state lateral deviation value in a self-driving system after the steady-state lateral deviation is eliminated.

According to a second aspect, a device for eliminating a steady-state lateral deviation is provided according embodiments of the present disclosure, which may include: a detection module, configured to determine whether a vehicle travels on a straight road; a collection module, configured to collect a lateral deviation value of the vehicle in a case that the vehicle travels on a straight road; a determination module, configured to determine whether the vehicle has the steady-state lateral deviation based on the collected lateral deviation value; and a compensation module, configured to compensate the steady-state lateral deviation of the vehicle in real time based on the collected lateral deviation value in a case that the vehicle has the steady-state lateral deviation.

In an implementation mode, the detection module may be configured to: detect a curvature of the road where the vehicle travels, a steering wheel angle of the vehicle and a velocity of the vehicle; and determine that the vehicle travels on the straight road in a case that the curvature of the road where the vehicle travels is smaller than a first predetermined value, the steering wheel angle of the vehicle is smaller than a second predetermined value and the velocity of the vehicle is greater than a third predetermined value.

In an implementation mode, the determination module may be configured to determine that the vehicle has the steady-state lateral deviation in case that the collected lateral deviation value is within a predetermined range.

In an implementation mode, the collection module is configured to collect the lateral deviation value of the vehicle repeatedly to obtain multiple lateral deviation values; the determination module is configured to calculate a statistical lateral deviation value based on the collected multiple lateral deviation values and, determine that the vehicle has the steady-state lateral deviation in a case that the statistical lateral deviation value is within the predetermined range; and the compensation module is configured to compensate the steady-state lateral deviation of the vehicle in real time based on the statistical lateral deviation value.

In an implementation mode, after the steady-state lateral deviation of the vehicle is compensated in real time, the steady-state lateral deviation elimination device may further be configured to: recollect the lateral deviation value of the vehicle to determine whether the steady-state lateral deviation is eliminated; linearly modify the statistical lateral deviation value based on a predetermined step length and compensate the steady-state lateral deviation of the vehicle based on the modified statistical lateral deviation value, in response to determining that the steady-state lateral deviation is not eliminated; and repeatedly execute the step of recollecting the lateral deviation value of the vehicle until it is determined that the steady-state lateral deviation is eliminated.

In an implementation mode, the steady-state lateral deviation elimination device may further be configured to store the steady-state lateral deviation value in a self-driving system after the steady-state lateral deviation is eliminated.

According to a third aspect, a device for eliminating a steady-state lateral deviation is provided according to embodiments of the present disclosure. A function of the device may be realized through hardware, and may also be realized by executing, through the hardware, corresponding software. The hardware or the software includes one or more modules corresponding to the function.

In an embodiment, a structure of the steady-state lateral deviation elimination device includes a processor and a memory. The memory is configured to store a program supporting the steady-state lateral deviation elimination device to execute the steady-state lateral deviation elimination method. The processor is configured to execute the program stored in the memory. The steady-state lateral deviation elimination device may further include a communication interface, configured for communication with another device or communication network.

According to a fourth aspect, a computer-readable storage medium is provided according to the embodiments of the present disclosure, which is configured to store a computer software instruction for a steady-state lateral deviation elimination device, including a program involved in execution of the steady-state lateral deviation elimination method.

One of the above technical solutions has the following advantages or beneficial effects.

According to the steady-state lateral deviation elimination solutions disclosed in the disclosure, collection of the lateral deviation value of the vehicle, determination about whether the vehicle has the steady-state lateral deviation and real-time compensation of the steady-state lateral deviation of the vehicle are automatically implemented. Compared with a continuous deviation rectification method for elimination of a lateral deviation in the existing technology, the solutions of the disclosure have the advantages that the vehicle with the steady-state lateral deviation may travel more steadily, a direction of the vehicle, particularly a direction during turning, is more accurate, self-driving safety and efficiency are improved, the sense of leftward and rightward swaying brought by the continuous deviation rectification method in the existing technology is effectively eliminated, and self-driving stability is improved.

The summary is only for the purpose of description and not intended to form limits in any manner. Besides the above-described schematic aspects, implementation modes and characteristics, further aspects, implementation modes and characteristics of the disclosure become easy to understand with reference to the drawings and the following detailed descriptions.

BRIEF DESCRIPTION OF THE DRAWINGS

In the drawings, unless otherwise specified, the same reference signs throughout multiple drawings represent the same or similar components or elements. These drawings are not always drawn to scale. It is to be understood that these drawings only show some implementation modes disclosed according to the disclosure and should not be considered as limits to the scope of the disclosure.

DETAILED DESCRIPTION

Some exemplary embodiments are simply described below only. As realized by those skilled in the art, the described embodiments may be modified in various manners without departing from the spirit or scope of the disclosure. Therefore, the drawings and the descriptions are considered to be substantially exemplary and nonrestrictive.

In the existing technology, a process mode of a steady-state lateral deviation is the same as a process mode of a non-steady-state lateral deviation (for example, a lateral deviation brought by a road condition). The lateral deviations are eliminated in a continuous deviation rectification manner. In such a manner, the sense of leftward and rightward swaying is brought to a driver and a passenger in a travelling process of a vehicle, and self-driving stability is not satisfied.

Figure 1:
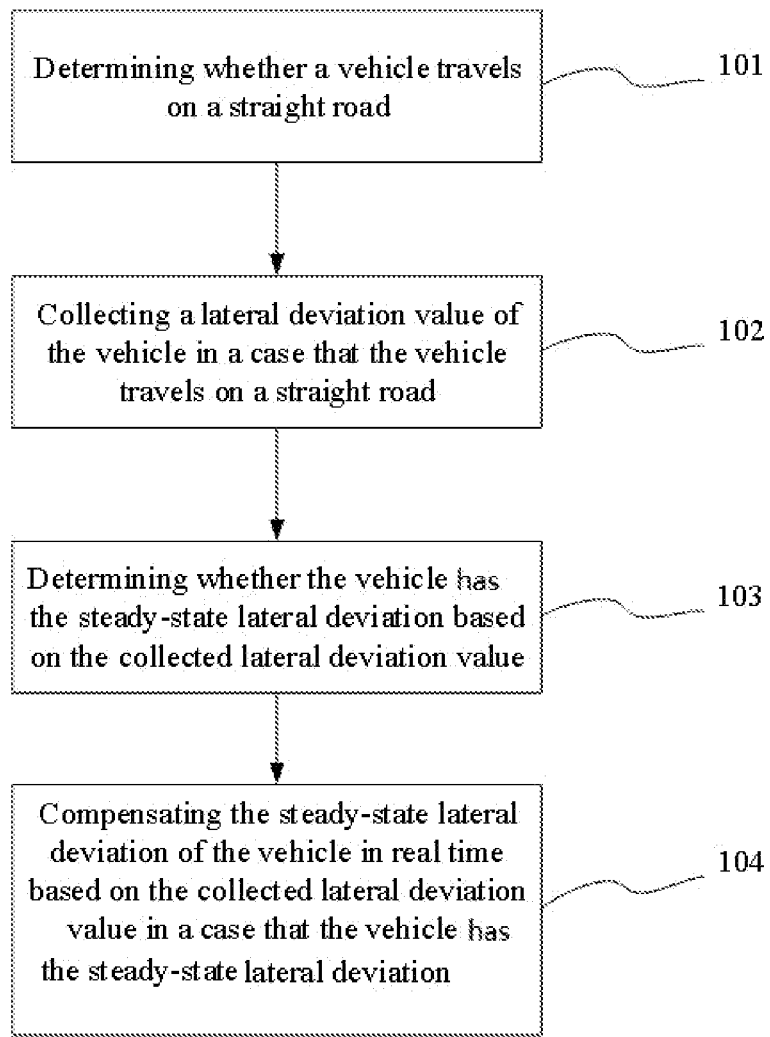
FIG. 1 is a schematic flowchart of a method for eliminating steady-state lateral deviation according to an embodiment of the disclosure.

FIG. 1 is a schematic flowchart of a method for eliminating steady-state lateral deviation according to an embodiment of the disclosure. As shown in FIG. 1, the method for eliminating steady-state lateral deviation includes the following steps.

In 101, determining whether a vehicle travels on a straight road.

During a practical operation, under the condition that the vehicle travels on the straight road, a lateral deviation may be measured relatively accurately; and during travelling at a curve with a relatively great curvature, a lateral deviation measurement error is relatively great.

In an implementation mode, determining that whether the vehicle travels on the straight road includes that: detect a curvature of the road where the vehicle travels, a steering wheel angle of the vehicle and a velocity of the vehicle; the vehicle is in a self-driving mode; and under the condition that the curvature of the road where the vehicle travels is smaller than a first predetermined value, the steering wheel angle of the vehicle is smaller than a second predetermined value and the velocity of the vehicle is greater than a third predetermined value, it is determined that the vehicle travels on the straight road. For example, it is determined according to the following conditions that the vehicle travels on the straight road: the curvature of the road is smaller than 0.05, the steering wheel angle is smaller than 1.5%, the velocity of the vehicle is greater than 3 m/s and the vehicle is in the self-driving mode. The curvature of the road may be provided by a driving planning unit or detected through a sensor and a camera. Under the condition that the curvature of the road and the steering wheel angle are relatively small and the velocity is relatively high, the lateral deviation measurement error is relatively small.

In an implementation mode, a present position of the vehicle is determined through a Global Positioning System (GPS) satellite map, whether the road where the vehicle is presently located is a straight road is determined in combination with an offline map or an online map connected to a mobile network, and whether the vehicle travels on the straight road is further determined.

In 102, collecting a lateral deviation value of the vehicle in a case that the vehicle travels on a straight road.

For example, an initial position of the vehicle is determined through a vehicle positioning unit, a target position of the vehicle after travelling for a period is predicted according to a travelling parameter (for example, the velocity, an acceleration/deceleration and the steering wheel angle) of the vehicle, the present position of the vehicle is determined after the vehicle travels for the period, and the lateral deviation value of the vehicle is collected according to a deviation of the target position and the present position.

In an implementation mode, the lateral deviation value of the vehicle may be collected repeatedly to obtain multiple lateral deviation values, and each collected lateral deviation value is stored in a storage system. For example, collection may be continuously performed for 300 times at an interval of 10 ms.

In 103, determining whether the vehicle has the steady-state lateral deviation based on the collected lateral deviation value.

During the practical operation, if the lateral deviation value is within a certain range, for example, the lateral deviation value is between 0.05 m to 0.5 m, it may be determined that the vehicle has the steady-state lateral deviation. The steady-state lateral deviation is a regular error and may cause the vehicle to travel leftwards or rightwards after travelling for a period of time, which may be described in detail in combination with FIG. 5. Correspondingly, a non-steady-state lateral deviation is a travelling noise produced by self-driving and is an irregular error.

A method for determining whether the vehicle has the steady-state lateral deviation will be described later in combination with FIG. 2 and FIG. 3 in more detail.

In 104, compensating the steady-state lateral deviation of the vehicle in real time based on the collected lateral deviation value in a case that the vehicle has the steady-state lateral deviation.

For example, responsive to detecting that the vehicle is rightwards deviated by 3 degrees, a steering wheel angle value in a lateral control unit is leftwards regulated by 3 degrees in real time to eliminate the steady-state lateral deviation. Therefore, the vehicle may travel more steadily, and a direction of the vehicle, particularly a direction during turning, is more accurate.

In an implementation mode, the steady-state lateral deviation of the vehicle is compensated in real time according to the collected lateral deviation value when it is determined that the vehicle has the steady-state lateral deviation, and after the steady-state lateral deviation is eliminated, the steady-state lateral deviation value is stored in a self-driving system for direct use in next driving.

Optionally, when the vehicle exits the self-driving mode, the stored steady-state lateral deviation may still be used to compensate a deviation of the lateral control unit of the vehicle.

Optionally, after the steady-state lateral deviation is eliminated, a driver or a user may be notified that the problem has been solved or such an event is recorded in a background database.

Figure 2:
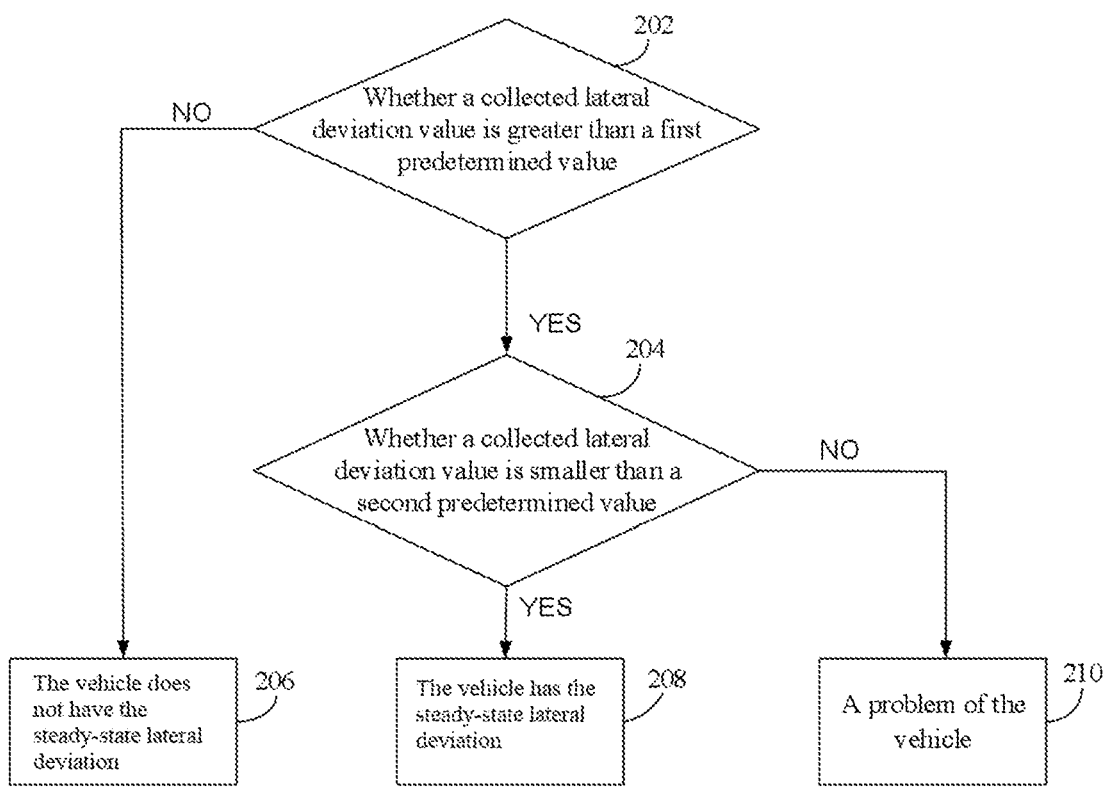
FIG. 2 is a flowchart of an implementation mode of determining whether a vehicle has a steady-state lateral deviation according to a collected lateral deviation value in FIG. 1.
Figure 3:
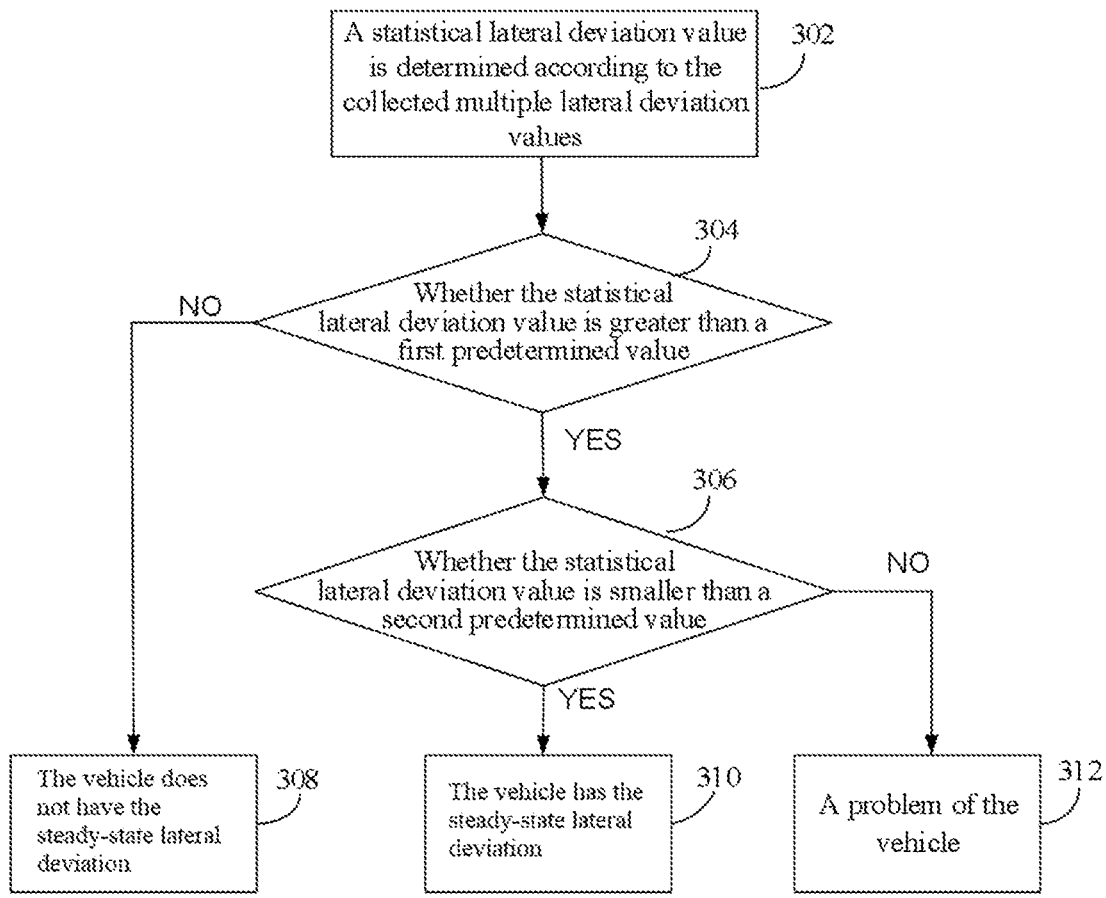
FIG. 3 is a flowchart of determining whether a vehicle has a steady-state lateral deviation based on a statistical lateral deviation value according to an embodiment of the disclosure.

FIG. 2 is a flowchart of an implementation mode of determining whether a vehicle has a steady-state lateral deviation according to a collected lateral deviation value in FIG. 1. The implementation mode mainly includes: determining the vehicle has the steady-state lateral deviation according to the collected lateral deviation value. If the collected lateral deviation value is smaller than a first predetermined value (for example 0.05 m) in 202, it may be determined in 206 that the vehicle does not have the steady-state lateral deviation. If the collected lateral deviation value is greater than a second predetermined value (for example 0.5 m) in 204, it may be determined in 210 that the lateral deviation is produced by an own problem of the vehicle, the numerical value is too large and there is practically no point in automatically compensating it. Optionally, the driver or the user may be notified that the lateral deviation is produced by the own problem of the vehicle. When the collected lateral deviation value is within a predetermined range, for example, 0.05 m to 0.5 m, it may be determined in 208 that the vehicle has the steady-state lateral deviation.

As described above, the collection of the lateral deviation value of the vehicle may be performed repeatedly to obtain multiple lateral deviation values. FIG. 3 is a flowchart of determining whether a vehicle has a steady-state lateral deviation according to collected multiple lateral deviation values according to an embodiment of the disclosure. Specifically, in 302, a statistical lateral deviation value is determined according to the collected multiple lateral deviation values. The statistical lateral deviation value may be, for example, a mean value of the collected multiple lateral deviation values.

Optionally, when the statistical lateral deviation value is determined according to the collected multiple lateral deviation values, the mean value of the multiple lateral deviation values may be collected as the statistical lateral deviation value. Optionally, a part of maximum data and a part of minimum data in the multiple lateral deviation values may be filtered, and a mean value of the remaining lateral deviation values is collected as the statistical lateral deviation value.

As described above, if the determined statistical lateral deviation value is smaller than the first predetermined value (for example, 0.05 m) in 304, it may be determined in 308 that the vehicle does not have the steady-state lateral deviation. If the determined statistical lateral deviation value is greater than the second predetermined value (for example, 0.5 m) in 306, it may be determined in 312 that the lateral deviation is produced by the own problem of the vehicle, the numerical value is too large and there is practically no point in automatically compensating it. Under the condition that the statistical lateral deviation value is within the predetermined range, for example, 0.05 m to 0.5 m, it may be determined in 310 that the vehicle has the steady-state lateral deviation.

Figure 4:
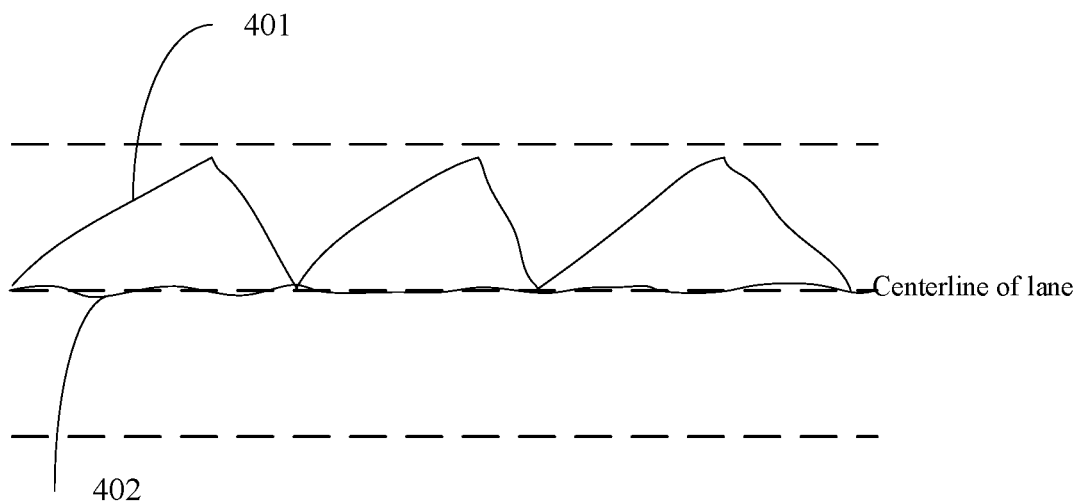
FIG. 4 is a schematic diagram of comparison between driving tracks before and after a steady-state lateral deviation is eliminated.

FIG. 4 is a schematic diagram of comparison between driving tracks before and after a steady-state lateral deviation is eliminated. As shown in FIG. 4, in 401, the driving track of the vehicle before the steady-state lateral deviation is eliminated. Before the steady-state lateral deviation is eliminated, the vehicle is deviated from a centerline of a lane and kept deviated to a certain direction in a driving process, and after a period of time, the positioning unit finds that the lateral deviation is relatively great and a deviation rectification unit rectifies the lateral deviation. In 402, the driving track of the vehicle after the lateral deviation is eliminated. A lateral error of a distance between the vehicle and the centerline of the lane in the driving process is smaller than a certain value, for example, smaller than 0.05 m.

Figure 5:
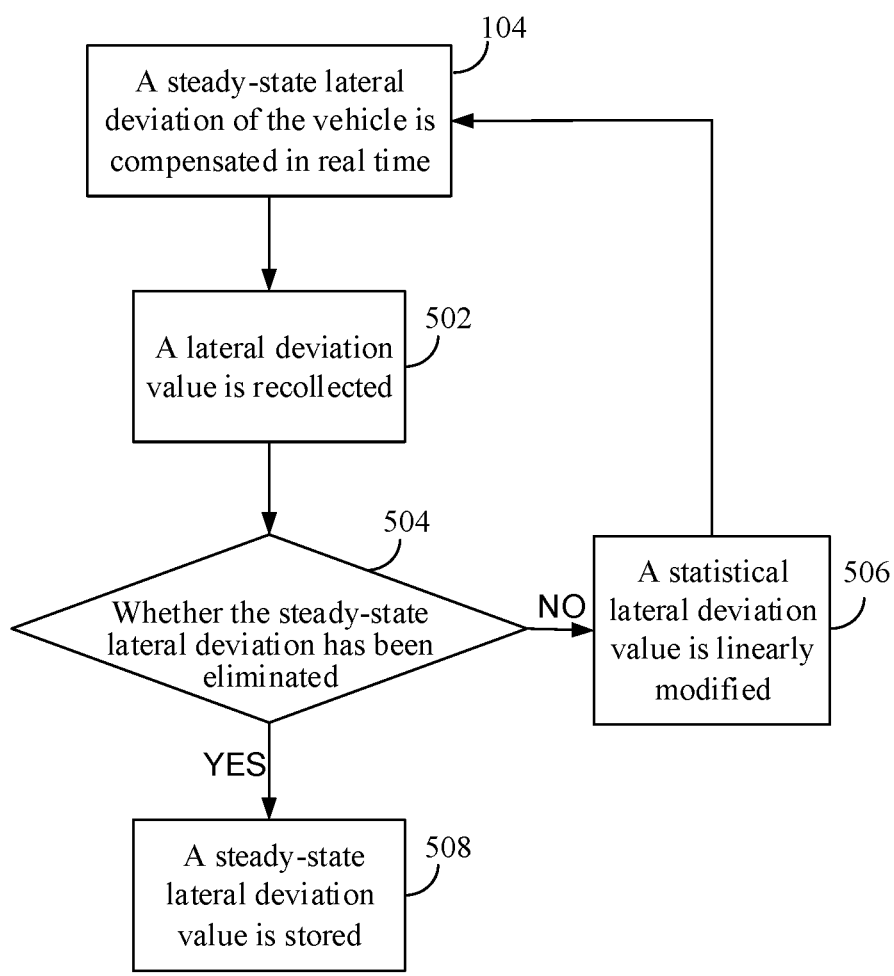
FIG. 5 is a flowchart of linearly modifying a statistical lateral deviation value based on a predetermined step length according to an embodiment of the disclosure.

In an implementation mode, after the steady-state lateral deviation of the vehicle is compensated in real time in 104, the lateral deviation value of the vehicle may be recollected in 502 to determine whether the steady-state lateral deviation has been eliminated. FIG. 5 is a flowchart of linearly modifying a statistical lateral deviation value based on a predetermined step length according to an embodiment of the disclosure. In 504, it is determined that the steady-state lateral deviation is not eliminated. In 506, the statistical lateral deviation value is linearly modified according to a predetermined step length, the steady-state lateral deviation of the vehicle is compensated in real time according to the modified statistical lateral deviation value, and the steps are repeatedly executed until it is determined that the steady-state lateral deviation is eliminated. After the steady-state lateral deviation is eliminated, the steady-state lateral deviation value may be stored in 508.

Optionally, if the predetermined step length is relatively great, there may exist the condition of excessive compensation with the statistical lateral deviation value, and statistical lateral deviation values used in last two times may be adopted as initial endpoints to collect a new statistical lateral deviation value by use of a bisection method to compensate the steady-state lateral deviation of the vehicle in real time.

Figure 6:
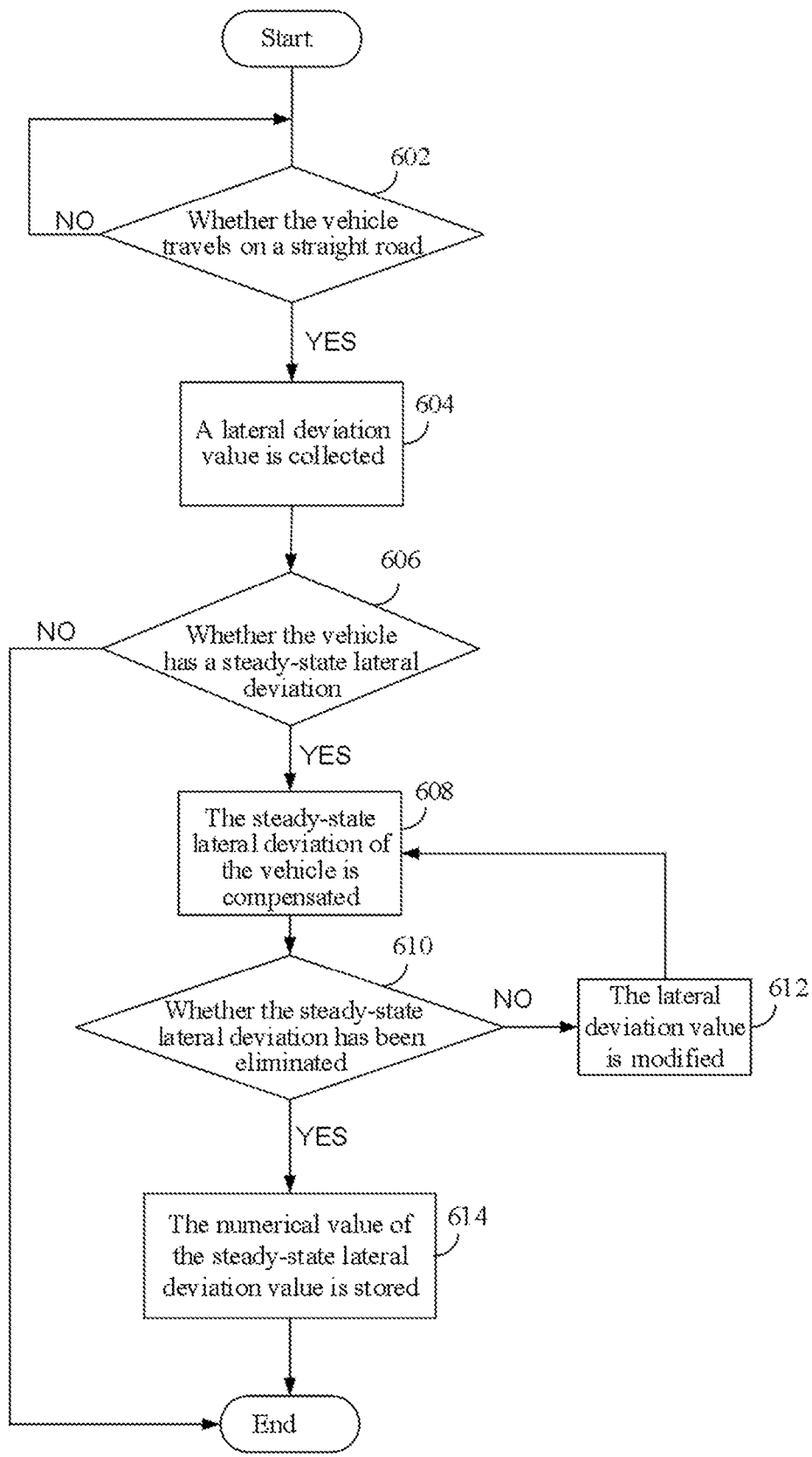
FIG. 6 is a flowchart of a method for eliminating steady-state lateral deviation according to an embodiment of the disclosure.

FIG. 6 is a flowchart of a steady-state lateral deviation elimination method according to an embodiment of the disclosure. The implementation mode mainly involves a steady-state lateral deviation elimination method, which specifically includes the following steps. In 602, whether a vehicle travels on a straight road is determined, and if the vehicle is detected not to travel on the straight road, detection is continued. In 604, a lateral deviation value of the vehicle is collected if it is determined that the vehicle travels on the straight road. In 606, whether the vehicle has a steady-state lateral deviation is determined according to the collected lateral deviation value, and if the vehicle does not have the steady-state lateral deviation, the method is ended. In 608, if it is determined that the vehicle has the steady-state lateral deviation, the steady-state lateral deviation of the vehicle is compensated in real time according to the collected lateral deviation value. In 610, whether the steady-state lateral deviation has been eliminated is determined. In 612, the lateral deviation value is modified, and 608 is re-executed to re-compensate the steady-state lateral deviation of the vehicle. In 614, a numerical value of the steady-state lateral deviation is stored, and the method is ended.

Figure 7:
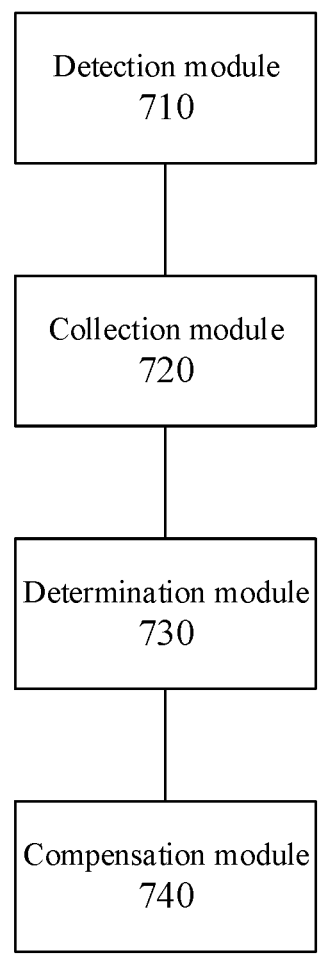
FIG. 7 is a schematic block diagram of a device for eliminating steady-state lateral deviation according to an embodiment of the disclosure.

FIG. 7 is a schematic block diagram of a steady-state lateral deviation elimination device according to an embodiment of the disclosure. The device includes a detection module 710, a collection module 720, a determination module 730 and a compensation module 740.

Specifically, the detection module 710 is configured to determine that whether a vehicle travels on a straight road. The collection module 720 is configured to collect a lateral deviation value of the vehicle in a case that the vehicle travels on a straight road. The determination module 730 is configured to determine whether the vehicle has the steady-state lateral deviation based on the collected lateral deviation value. The compensation module 740 is configured to compensate the steady-state lateral deviation of the vehicle in real time based on the collected lateral deviation value in a case that the vehicle has the steady-state lateral deviation.

In an implementation mode, the detection module 710 is configured to: detect a curvature of the road where the vehicle travels, a steering wheel angle of the vehicle and a velocity of the vehicle; and determine that the vehicle travels on the straight road in a case that the curvature of the road where the vehicle travels is smaller than a first predetermined value, the steering wheel angle of the vehicle is smaller than a second predetermined value and the velocity of the vehicle is greater than a third predetermined value.

In an implementation mode, the determination module 730 is configured to, determine that the vehicle has the steady-state lateral deviation in case that the collected lateral deviation value is within a predetermined range.

In an implementation mode, the collection module 720 is configured to collect the lateral deviation value of the vehicle repeatedly to obtain multiple lateral deviation values; the determination module 730 is configured to determine a statistical lateral deviation value based on the collected multiple lateral deviation values and determine that the vehicle has the steady-state lateral deviation in a case that the statistical lateral deviation value is within the predetermined range; and the compensation module 740 is configured to compensate the steady-state lateral deviation of the vehicle in real time based on the statistical lateral deviation value.

In an implementation mode, the steady-state lateral deviation elimination device, after the steady-state lateral deviation of the vehicle is compensated in real time, is further configured to: recollect the lateral deviation value of the vehicle to determine whether the steady-state lateral deviation is eliminated; linearly modify the statistical lateral deviation value based on a predetermined step length and compensate the steady-state lateral deviation of the vehicle based on the modified statistical lateral deviation value, in response to determining that the steady-state lateral deviation is not eliminated; and repeatedly execute the step of recollecting the lateral deviation value of the vehicle until it is determined that the steady-state lateral deviation is eliminated.

In an implementation mode, the steady-state lateral deviation elimination device is further configured to, after the steady-state lateral deviation is eliminated, store the steady-state lateral deviation value in a self-driving system.

The function of each module in each device of the embodiment of the disclosure may refer to the corresponding descriptions in the method and will not be elaborated herein.

Figure 8:
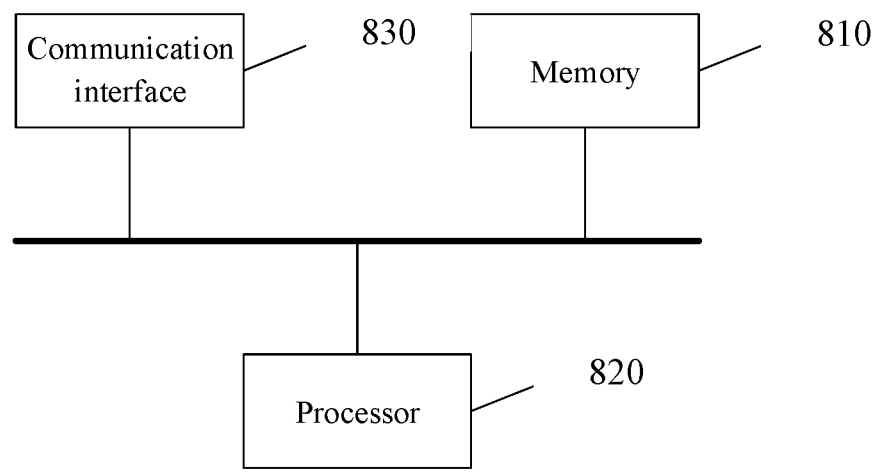
FIG. 8 is a structure block diagram of a device for eliminating steady-state lateral deviation according to an embodiment of the disclosure.

FIG. 8 is a structure block diagram of a steady-state lateral deviation elimination device according to an embodiment of the disclosure. As shown in FIG. 8, the steady-state lateral deviation elimination device includes a memory 810 and a processor 820. A computer program capable of travelling in the processor 820 is stored in the memory 810. The processor 820 executes the computer program to implement the steady-state lateral deviation elimination method in the abovementioned embodiment. The numbers of the memory 810 and the processor 820 may be one or more.

The steady-state lateral deviation elimination device further includes a communication interface 830.

The communication interface 830 is configured to communicate with an external device for interactive data transmission.

The memory 810 may include a high-speed Random Access Memory (RAM) and may also include a non-volatile memory, for example, at least one disk memory.

If the memory 810, the processor 820 and the communication interface 830 are independently implemented, the memory 810, the processor 820 and the communication interface 830 may be connected with one another and complete communication with one another through a bus. The bus may be an Industry Standard Architecture (ISA) bus, a Peripheral Component Interconnect (PCI) bus or an Extended Industry Standard Component (EISA) bus, etc. The bus may be divided into an address bus, a data bus, a control bus and the like. For convenient representation, only one bold line is adopted for representation in FIG. 8, but it is not indicated that there is only one bus or one type of bus.

Optionally, during specific implementation, if the memory 810, the processor 820 and the communication interface 830 are integrated into a chip, the memory 810, the processor 820 and the communication interface 830 may complete communication with one another through an internal interface.

An embodiment of the disclosure provides a computer-readable storage medium, which stores a computer program, the program being executed by a processor to implement any method in the abovementioned embodiment.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means two or more than two, unless otherwise limited definitely and specifically.

Any process or method in the flowcharts or described herein in another manner may be understood to represent a module, segment or part including codes of one or more executable instructions configured to realize specific logic functions or steps of the process and, moreover, the scope of the preferred implementation mode of the disclosure includes other implementation, not in a sequence shown or discussed herein, including execution of the functions basically simultaneously or in an opposite sequence according to the involved functions. This should be understood by those skilled in the art of the embodiments of the disclosure.

Logics and/or steps represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a RAM, a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It is to be understood that each part of the disclosure may be implemented by hardware, software, firmware or a combination thereof. In the abovementioned implementation modes, multiple steps or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the steps in the method of the abovementioned embodiment may be completed through related hardware instructed by a program, the program may be stored in a computer-readable storage medium, and when the program is executed, one or combination of the steps of the method embodiment is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium. The storage medium may be a ROM, a magnetic disk, an optical disk or the like.

The above is only the specific implementation mode of the disclosure and not intended to limit the scope of protection of the disclosure. Various variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for eliminating a steady-state lateral deviation of a vehicle in a self-driving mode, comprising:
   determining, by a computing device implemented by circuits, whether the vehicle travels on a straight road, wherein the computing device comprises a computer-based system or a system including a processor;
   collecting, by the computing device, a lateral deviation value of the vehicle in a case that the vehicle travels on a straight road;
   determining, by the computing device, whether the vehicle has the steady-state lateral deviation based on whether the collected lateral deviation value is within a predetermined range, wherein the steady-state lateral deviation is caused by the vehicle itself after the vehicle enters the self-driving mode; and
   compensating, by the computing device, the steady-state lateral deviation of the vehicle in real time based on the collected lateral deviation value in a case that the vehicle has the steady-state lateral deviation.

2. The method of claim 1, wherein determining, by the computing device, whether the vehicle travels on the straight road comprises:
   detecting, by a detection device, a curvature of the road where the vehicle travels, a steering wheel angle of the vehicle and a velocity of the vehicle; and
   determining, by the computing device, that the vehicle travels on the straight road in a case that the curvature of the road where the vehicle travels is smaller than a first predetermined value, the steering wheel angle of the vehicle is smaller than a second predetermined value and the velocity of the vehicle is greater than a third predetermined value.

3. The method of claim 2, wherein collecting, by the computing device, the lateral deviation value of the vehicle comprises: collecting, by the computing device, the lateral deviation value of the vehicle repeatedly to obtain multiple lateral deviation values;
   determining, by the computing device, that the vehicle has the steady-state lateral deviation based on whether the collected lateral deviation value is within the predetermined range comprises: calculating, by the computing device, a statistical lateral deviation value based on the collected multiple lateral deviation values, and determining, by the computing device, that the vehicle has the steady-state lateral deviation in a case that the statistical lateral deviation value is within the predetermined range; and
   compensating, by the computing device, the steady-state lateral deviation of the vehicle in real time based on the collected lateral deviation value comprises: compensating, by the computing device, the steady-state lateral deviation of the self driving vehicle in real time based on the statistical lateral deviation value.

4. The method of claim 2, further comprising:
   storing the steady-state lateral deviation value in a self-driving system after the steady-state lateral deviation is eliminated.

5. A non-transitory computer-readable storage medium, in which an instruction is stored, the instruction being executed by a processor to enable the processor to implement the method claim 2.

6. The method of claim 1, wherein determining, by the computing device, whether the vehicle has the steady-state lateral deviation based on whether the collected lateral deviation value is within the predetermined range comprises:
   determining, by the computing device, that the vehicle has the steady-state lateral deviation in a case that the collected lateral deviation value is within the predetermined range.

7. The method of claim 6, wherein collecting, by the computing device, the lateral deviation value of the vehicle comprises: collecting, by the computing device, the lateral deviation value of the vehicle repeatedly to obtain multiple lateral deviation values;
   determining, by the computing device, that the vehicle has the steady-state lateral deviation based on whether the collected lateral deviation value is within the predetermined range comprises: calculating, by the computing device, a statistical lateral deviation value based on the collected multiple lateral deviation values, and determining, by the computing device, that the vehicle has the steady-state lateral deviation in a case that the statistical lateral deviation value is within the predetermined range; and
   compensating, by the computing device, the steady-state lateral deviation of the vehicle in real time based on the collected lateral deviation value comprises: compensating, by the computing device, the steady-state lateral deviation of the vehicle in real time based on the statistical lateral deviation value.

8. The method of claim 1, wherein collecting, by the computing device, the lateral deviation value of the vehicle comprises: collecting, by the computing device, the lateral deviation value of the vehicle repeatedly to obtain multiple lateral deviation values;
   determining, by the computing device, that the vehicle has the steady-state lateral deviation based on whether the collected lateral deviation value is within the predetermined range comprises: calculating, by the computing device, a statistical lateral deviation value based on the collected multiple lateral deviation values, and determining, by the computing device, that the vehicle has the steady-state lateral deviation in a case that the statistical lateral deviation value is within the predetermined range; and
   compensating, by the computing device, the steady-state lateral deviation of the vehicle in real time based on the collected lateral deviation value comprises: compensating, by the computing device, the steady-state lateral deviation of the vehicle in real time based on the statistical lateral deviation value.

9. The method of claim 8, wherein after compensating, by the computing device, the steady-state lateral deviation of the vehicle in real time, the method further comprises:
   recollecting, by the computing device, the lateral deviation value of the vehicle to determine whether the steady-state lateral deviation is eliminated;
   linearly modifying, by the computing device, the statistical lateral deviation value based on a predetermined step length and compensating, by the computing device, the steady-state lateral deviation of the vehicle based on the modified statistical lateral deviation value, in response to determining that the steady-state lateral deviation is not eliminated; and repeatedly executing, by the computing device, the step of recollecting the lateral deviation value of the vehicle until it is determined that the steady-state lateral deviation is eliminated.

10. The method of claim 1, further comprising:
storing the steady-state lateral deviation value in a self-driving system after the steady-state lateral deviation is eliminated.

11. A non-transitory computer-readable storage medium, in which an instruction is stored, the instruction being executed by a processor to enable the processor to implement the method claim 1.

12. A device for eliminating a steady-state lateral deviation of a in a self-driving mode, comprising:
one or more processors;
a storage device configured to store one or more programs;
wherein the one or more programs are executed by the one or more processors to enable the one or more processors to:
determine whether the vehicle travels on a straight road;
collect a lateral deviation value of the vehicle in a case that the vehicle travels on a straight road;
determine whether the vehicle has the steady-state lateral deviation based on whether the collected lateral deviation value is within a predetermined range, wherein the steady-state lateral deviation is caused by the vehicle itself after the vehicle enters the self-driving mode; and
compensate the steady-state lateral deviation of the vehicle in real time based on the collected lateral deviation value in a case that the vehicle has the steady-state lateral deviation.

13. The device of claim 12, wherein the one or more programs are executed by the one or more processors to enable the one or more processors to:
detect a curvature of the road where the vehicle travels, a steering wheel angle of the vehicle and a velocity of the vehicle; and
determine that the vehicle travels on the straight road in a case that the curvature of the road where the vehicle travels is smaller than a first predetermined value, the steering wheel angle of the vehicle is smaller than a second predetermined value and the velocity of the vehicle is greater than a third predetermined value.

14. The device claim 13, wherein the one or more programs are executed by the one or more processors to enable the one or more processors to:
collect the lateral deviation value of the vehicle repeatedly to obtain multiple lateral deviation values;
calculate a statistical lateral deviation value based on the collected multiple lateral deviation values and, determine that the vehicle has the steady-state lateral deviation in a case that the statistical lateral deviation value is within the predetermined range; and
compensate the steady-state lateral deviation of the vehicle in real time based on the statistical lateral deviation value.

15. The device of claim 13, the one or more programs are executed by the one or more processors to enable the one or more processors to:
store the steady-state lateral deviation value in a self-driving system after the steady-state lateral deviation is eliminated.

16. The device of claim 12, wherein the one or more programs are executed by the one or more processors to enable the one or more processors to: determine that the vehicle has the steady-state lateral deviation in case that the collected lateral deviation value is within the predetermined range.

17. The device of claim 16, wherein the one or more programs are executed by the one or more processors to enable the one or more processors to:
collect the lateral deviation value of the vehicle repeatedly to obtain multiple lateral deviation values;
calculate a statistical lateral deviation value based on the collected multiple lateral deviation values and, determine that the vehicle has the steady-state lateral deviation in a case that the statistical lateral deviation value is within the predetermined range; and
compensate the steady-state lateral deviation of the vehicle in real time based on the statistical lateral deviation value.

18. The device of claim 12, wherein the one or more programs are executed by the one or more processors to enable the one or more processors to:
collect the lateral deviation value of the vehicle repeatedly to obtain multiple lateral deviation values;
calculate a statistical lateral deviation value based on the collected multiple lateral deviation values and, determine that the vehicle has the steady-state lateral deviation in a case that the statistical lateral deviation value is within the predetermined range; and
compensate the steady-state lateral deviation of the vehicle in real time based on the statistical lateral deviation value.

19. The device of claim 18, after the steady-state lateral deviation of the vehicle is compensated in real time, the one or more programs are executed by the one or more processors to enable the one or more processors to:
recollect the lateral deviation value of the vehicle to determine whether the steady-state lateral deviation is eliminated;
linearly modify the statistical lateral deviation value based on a predetermined step length and compensate the steady-state lateral deviation of the vehicle based on the modified statistical lateral deviation value, in response to determining that the steady-state lateral deviation is not eliminated; and
repeatedly execute the step of recollecting the lateral deviation value of the vehicle until it is determined that the steady-state lateral deviation is eliminated.

20. The device of claim 12, the one or more programs are executed by the one or more processors to enable the one or more processors to:
store the steady-state lateral deviation value in a self-driving system after the steady-state lateral deviation is eliminated.

* * * * *